Figure 1:
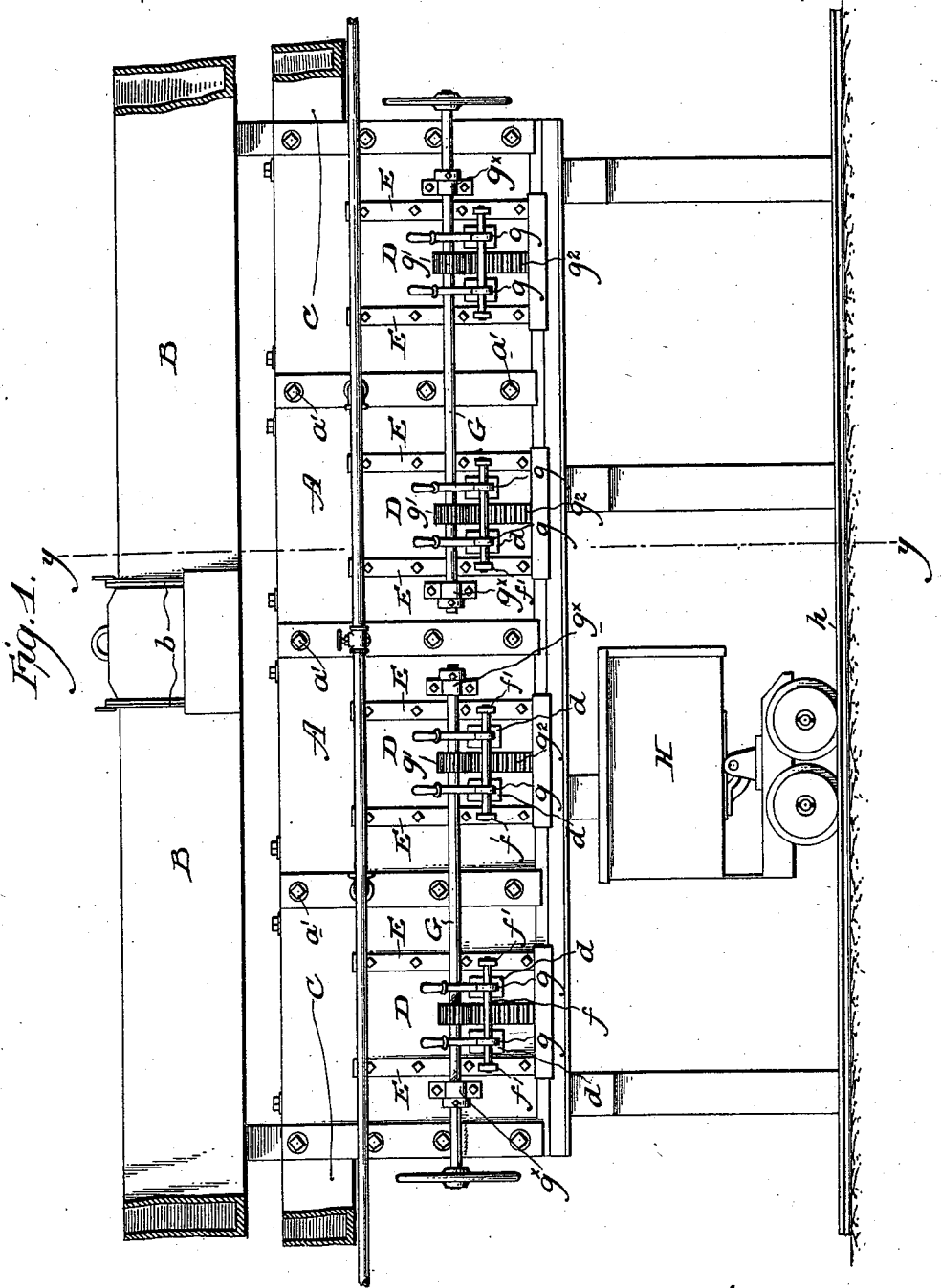

(No Model.) 6 Sheets—Sheet 1.

J. S. DOUGHERTY.
METHOD OF RECOVERING CONCENTRATES AND APPARATUS FOR CARRYING OUT SAID METHOD.

No. 530,753. Patented Dec. 11, 1894.

WITNESSES:

INVENTOR:

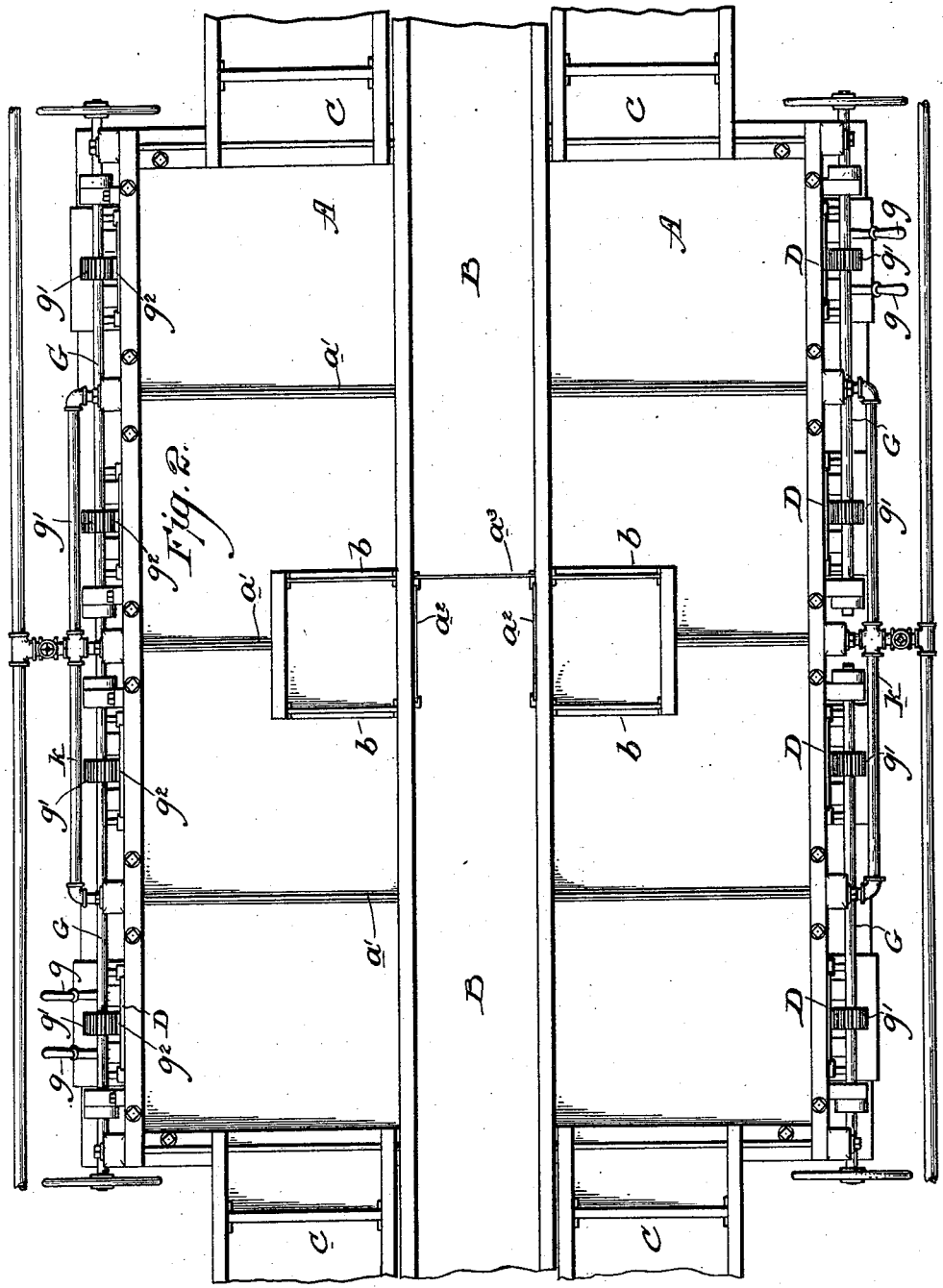

(No Model.) 6 Sheets—Sheet 3.
J. S. DOUGHERTY.
METHOD OF RECOVERING CONCENTRATES AND APPARATUS FOR CARRYING OUT SAID METHOD.
No. 530,753. Patented Dec. 11, 1894.
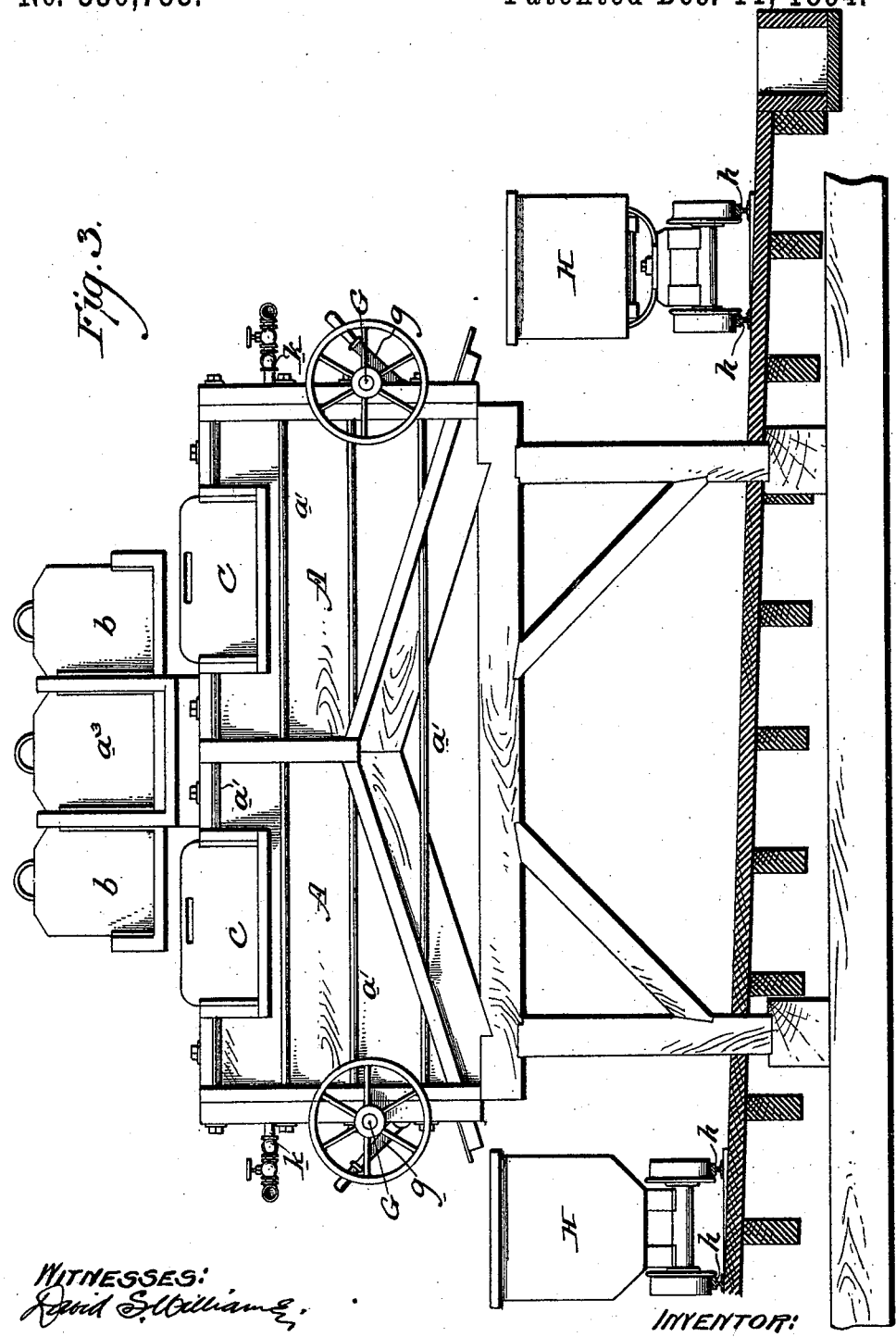

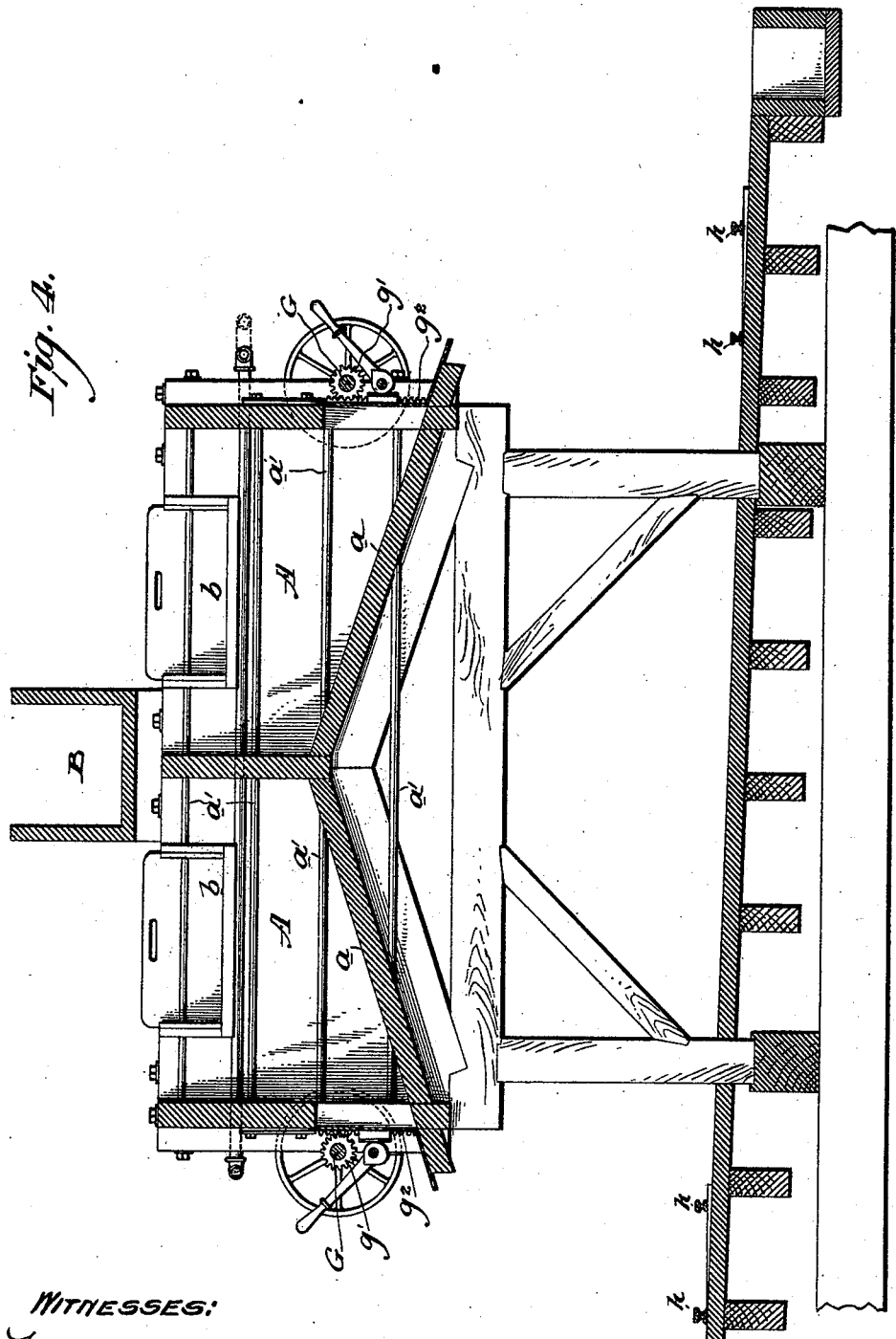

(No Model.) 6 Sheets—Sheet 5.
J. S. DOUGHERTY.
METHOD OF RECOVERING CONCENTRATES AND APPARATUS FOR CARRYING OUT SAID METHOD.
No. 530,753. Patented Dec. 11, 1894.
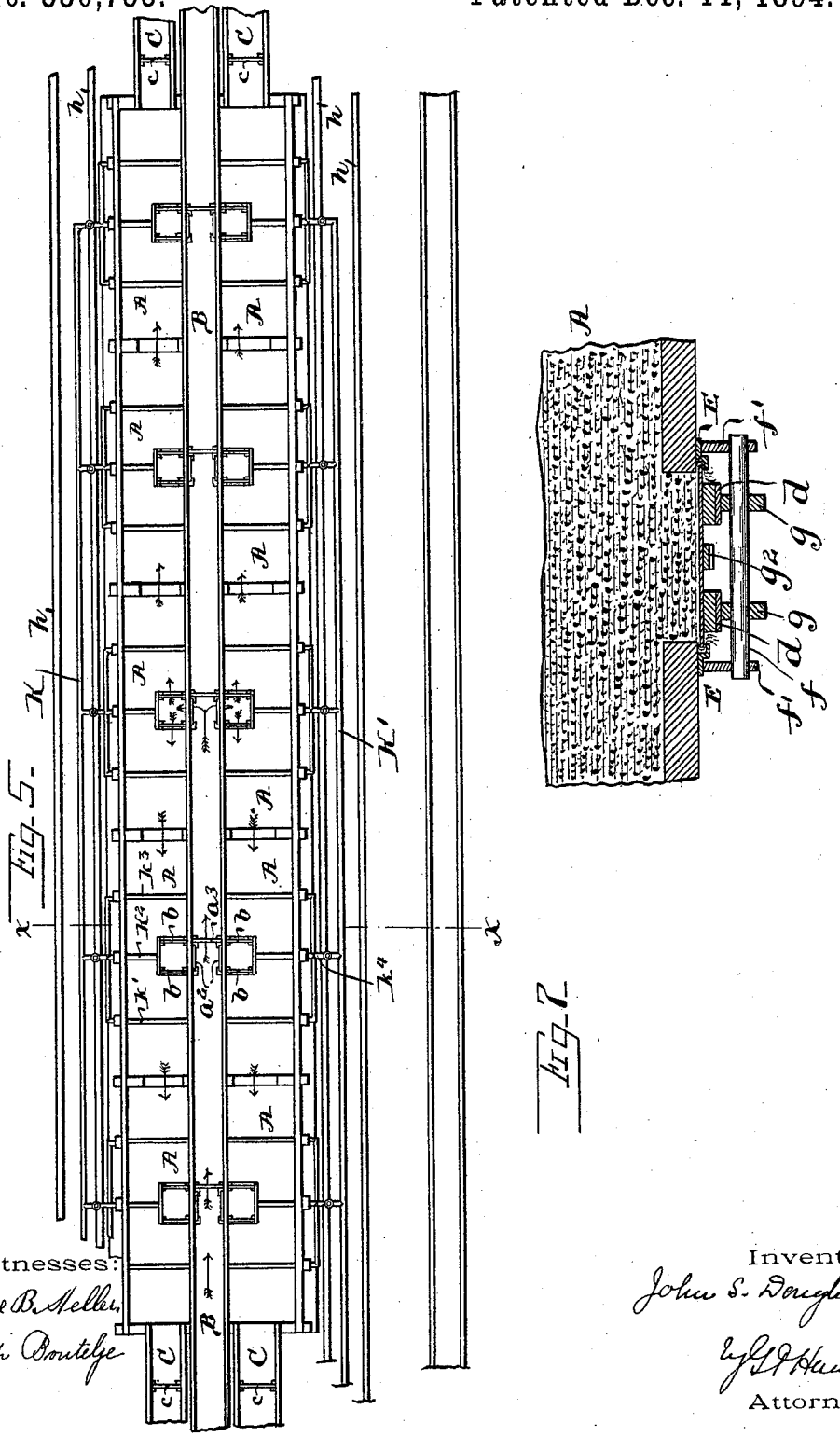
Witnesses:
Inventor.
John S. Dougherty
Attorney.

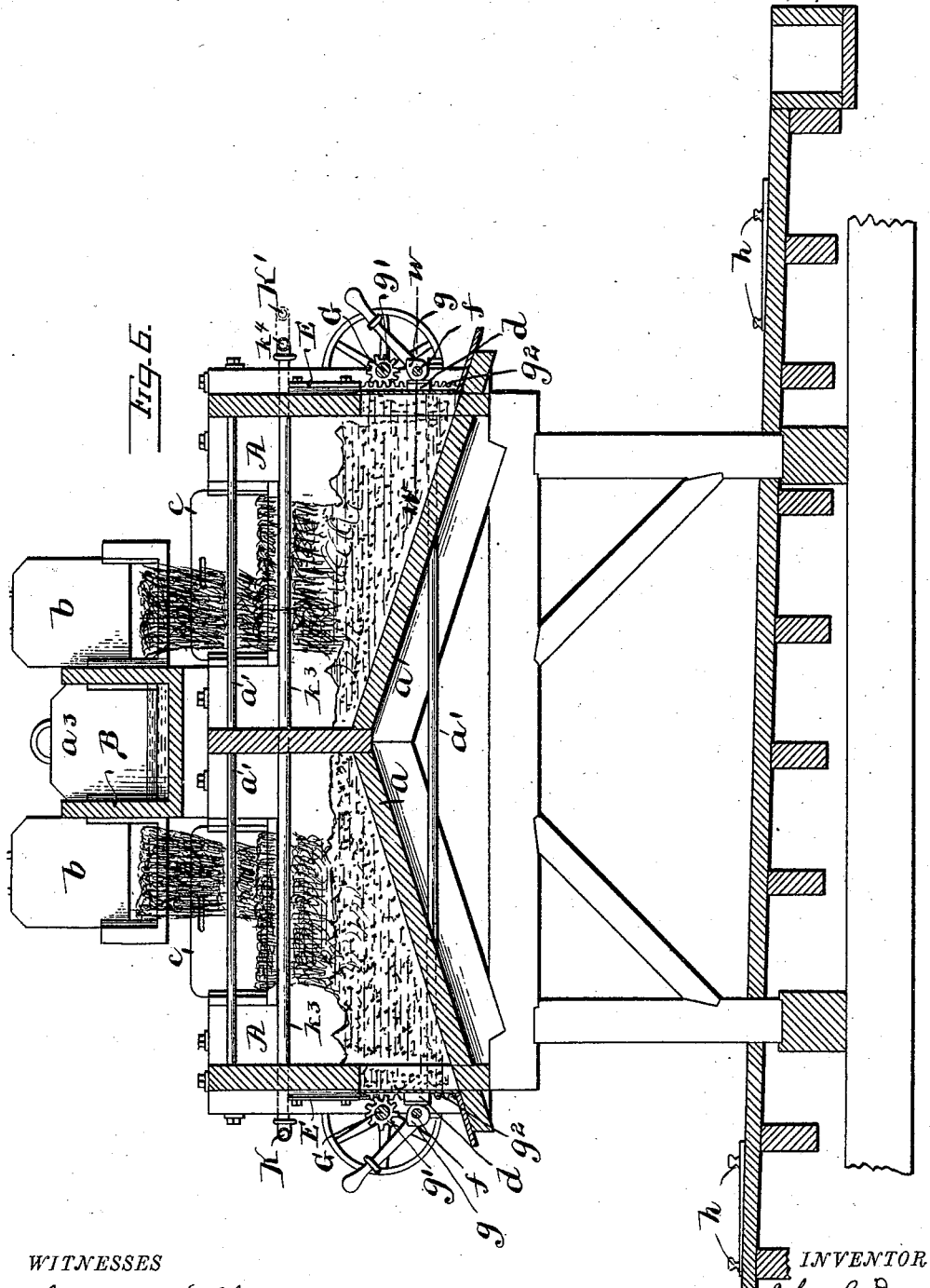

UNITED STATES PATENT OFFICE.

JOHN S. DOUGHERTY, OF ANACONDA, MONTANA, ASSIGNOR TO MARCUS DALY, OF SAME PLACE.

METHOD OF RECOVERING CONCENTRATES AND APPARATUS FOR CARRYING OUT SAID METHOD.

SPECIFICATION forming part of Letters Patent No. 530,753, dated December 11, 1894.

Application filed May 19, 1892. Serial No. 433,517. (No model.)

*To all whom it may concern:*

Be it known that I, JOHN S. DOUGHERTY, a citizen of the United States, residing at Anaconda, county of Deer Lodge, and State of Montana, have invented new and useful Improvements in Methods of Recovering Concentrates and Apparatus for Carrying Out said Methods, of which the following is a full, clear, and exact description, reference being had to the accompanying drawings, which form a part of this specification.

In the treatment of ores which require concentration before being smelted or otherwise treated, the concentrates, after having passed through the several jigging operations, are mixed or held in partial solution with water, and it is necessary to recover these solid matters from the liquid in order to further treat them, and my improved method and apparatus has for its purpose more rapid and thorough separation of the liquid from the solid matter than has heretofore been accomplished.

I will describe my improvement as the same has been applied to the treament of concentrates of copper ore, although it is evident that the same may be applied to concentrates of any other ores.

The apparatus consists as follows:

In the drawings—Figure 1 is a side elevation of apparatus for carrying out my improvement. Fig. 2 is a plan view of the same. Fig. 3 is an end view. Fig. 4 is a section on line $y$—$y$, Fig. 1. Fig. 5 is a plan view of a series of tanks. Fig. 6 is a section on line $x$—$x$, Fig. 5. Fig. 7 is a section on line $w$—$w$, Fig. 6.

My apparatus for carrying out my improved method consists essentially of a series of tanks or vats A provided with inclined bottoms $a$ constructed in series, with a central flume B, which flume leads from the concentrating machinery and carries the concentrated mineral mixed with water. In the drawings I have shown one tank on each side of said flume, or rather one double tank on each side of said flume. These tanks are provided with stay rods $a'$.

$a^2$ are gates which open from the flume B adjacent to each of these tanks, and $b$ are gates which connect the two halves of the tank so that the liquid coming from the flume can be made to pass either to the right or to the left at whatever gate may be open.

$a^3$ is a gate in the flume B and closes the flume beyond the gates $a^2$ and prevents the liquid in the flume from passing beyond and to the next tank, which is of the same character there being a gate $a^3$ in the flume B between each tank of the series.

At the end of each series of tanks are provided flumes C closed by gate $c$ to carry off the liquid which holds the concentrates in suspension. On the front of each tank are four doors, which consist of iron plates D, which rest in guides E, in which slides the doors D have a slight play horizontally. (See Fig. 7.) On each side of the door is an iron plate $d$, and $f$ is a shaft or rod which is secured loosely in bearings $f'$ upon each side of the guides E. Attached to this shaft or rod, adjacent to each one of the plates are the eccentric clamps $g$, by turning which the doors are pressed tight in place against the side of the tanks or vats.

G is a shaft having a hand wheel at its end, said shaft being secured in bearings $g^\times$ and having the cog-wheels $g'$ which work in the lugs $g^2$ on the doors.

The size of the tank is preferably sixteen feet long, six feet high, and three feet deep on one side, running on an angle to the depth of five feet on the other, and the system is operated preferably in lines of ten double tanks, each one separated from the other and havings openings into a central flume, with gates in said flume adjacent to gates in said tanks. Each line of ten tanks is supplied with outlets or overflow flumes C to carry off the water after it has been cleared of its mineral contents. The concentrated mineral is transported in water from the concentrating machinery into the large central flume and is deposited in the center of the line of tanks, one half of which is distributed on each side and flows through the tanks to the flumes on each end the connecting walls between the tanks being of less height than the other walls of the tank. Thus the first tank into which the material passes will fill with coarse concentrates, while in the end tank will be deposited slimes, or fine concentrates. In this way, after the end tanks have become half full of slime, the incoming water is reversed and it is allowed to come in at that end of the series of tanks, dividing it in equal parts at each end, thus allowing it to flow toward the center, whereby the coarse concentrates are deposited in the tanks which previously held the fine concentrates, thus making a full and complete mixture. After the tanks have become full and the main portion of the water has passed off it becomes necessary to more thoroughly dry the concentrates, and I accomplish this in the following manner. (See Fig. 7.) The eccentric clamps are turned, allowing a small play to the doors, as hereinbefore described, which play is not sufficient to allow the concentrates or solid matter to pass out, but is sufficient to allow the water to filter or pass through the concentrates and drain out through this opening. The weight of the material itself assists in forcing this water out and the angle toward the door assists the filtration also, and thus the concentrates are left almost absolutely free from moisture which is a great saving, as, if the concentrates were removed in a semi-dry condition, it would require that much more heat in the succeeding steps of the refining to drive off said moisture. When the concentrates become sufficiently dry to remove the doors are opened by turning the hand wheels, and cars H, running upon the tracks $h$ are run in line with the doors and the angle of the bottom causes all material to slide out through said doors into said cars, thus saving a large amount of labor. If it is desired or deemed necessary a further drying by steam may be used by means of a steam pipe K which receives steam from a source of steam supply and passes along one side of a series of tanks. At each tank on the side which said pipe extends, a connection is made with a secondary pipe $k$, from which latter three branches $k'$ $k^2$ and $k^3$ extend through the tanks on the side of the flume B to a corresponding pipe $k^4$ on the side of the series of tanks opposite to that of the pipe $k$ and which last mentioned pipe $k^4$ is connected with the pipe K' which extends along the side of the series of tanks opposite to that of pipe K and is the return pipe for the steam. After a tank full of concentrates has become as dry as is possible by filtration, steam may be admitted through these pipes and evaporation continued until moisture is entirely removed.

The great advantage of my system is that I not only remove the surface water in which the concentrates are carried from the concentrating machinery, but, by my improved method, the water, which is held in the concentrates, filters out from said concentrates out of the tank, the concentrates by their own weight assisting in expelling said water, the same being a system of filtration as it were in the removal of the liquid.

My improved method is of great advantage in the rapidity with which the same may be carried on, the greater condition of dryness to which the concentrates are brought, and the saving of labor.

In Fig. 6 I have shown the concentrates entering the tank from the main flume, and in Fig. 7 I have shown the filtering action produced by moving the plates D in the guides E.

Having now fully described my invention, what I claim, and desire to protect by Letters Patent, is—

1. In an apparatus for recovering concentrates, the combination with a series of tanks of a flume which extends along said tanks a gate between said flume and one of the tanks and a gate in said flume adjacent to the gate between flume and tank.

2. In an apparatus for recovering concentrates, the combination with a series of tanks of a flume which extends alongside said tanks, gates between said flume and two or more of said tanks and gates in said flume adjacent to the gates between the flume and tanks and outlets from one tank to the adjacent tank in the series.

3. In an apparatus for recovering concentrates, a tank provided with an inclined bottom, guides in the side of said tank, an opening in said tank, a plate adapted to rest and have play in said guides and mechanism substantially as described to force said plate against the side of the tank.

4. In an apparatus for recovering concentrates, a tank provided with an inclined bottom, guides in the side of said tank, an opening in said tank, a plate adapted to rest and have play in said guides, and an eccentric adapted to force said gate against the side of said tank.

5. In an apparatus for recovering concentrates, a tank provided with an inclined bottom, guides in the side of said tank, an opening in said tank, a plate adapted to rest and have play in said guides, a bearing upon each of said guides, a shaft in said bearings, and eccentric clamps upon said shaft adapted to press against said plate.

6. The hereinbefore described method of recovering concentrates, which consists in admitting the concentrates to one end of a series of tanks, allowing the liquid to overflow from one tank to the other to the end of the series of tanks, then reversing by admitting the concentrates to the tank at the other end of the series and allowing the liquid to overflow from one tank to the other to the tank first mentioned.

In testimony of which invention I have hereunto set my hand.

JOHN S. DOUGHERTY.

Witnesses:
D. M. CARR,
EUGENE S. MCDONALD.